United States Patent [19]

Scholz et al.

[11] 4,327,937
[45] May 4, 1982

[54] DOWNWARDLY FOLDABLE COVERING FOR A GAS CUSHION

[75] Inventors: Hansjürgen Scholz, Waldenbuch; Luigi Brambilla, Böblingen; Hans-Gerd Backhaus, Ingolstadt; Jürgen Körber, Sindelfingen, all of Fed. Rep. of Germany

[73] Assignee: Daimler-Benz Aktiengesellschaft, Stuttgart, Fed. Rep. of Germany

[21] Appl. No.: 90,612

[22] Filed: Nov. 2, 1979

[30] Foreign Application Priority Data

Nov. 9, 1978 [DE] Fed. Rep. of Germany ....... 2848547

[51] Int. Cl.³ .............................................. B60R 21/08
[52] U.S. Cl. ...................................... 280/732; 180/90; 280/752
[58] Field of Search ............... 280/732, 731, 730, 729, 280/728, 743, 752; 180/90

[56] References Cited

U.S. PATENT DOCUMENTS

| 3,794,349 | 2/1974 | Fuller | 280/732 |
| 3,904,222 | 9/1975 | Bursott et al. | 280/732 |
| 4,097,064 | 6/1978 | Ikawa et al. | 280/732 |

FOREIGN PATENT DOCUMENTS 2643451 4/1977 Fed. Rep. of Germany ...... 280/732

*Primary Examiner*—Joseph F. Peters, Jr.
*Assistant Examiner*—Milton L. Smith
*Attorney, Agent, or Firm*—Craig and Antonelli

[57] ABSTRACT

A covering for a folded gas cushion which is adapted to fold open by pivoting down, and which is provided with a reinforcement embedded in a padding layer; the reinforcement consists of a very strong synthetic plastic fabric that, prior to the foaming of the padding layer, is connected, for example, by gluing with a deformable lower fastening part; an anchoring for the covering is produced by a groove- and spring-like cooperation of at least one section of a boundary edge of the covering with an adjoining fixed vehicle part.

3 Claims, 1 Drawing Figure

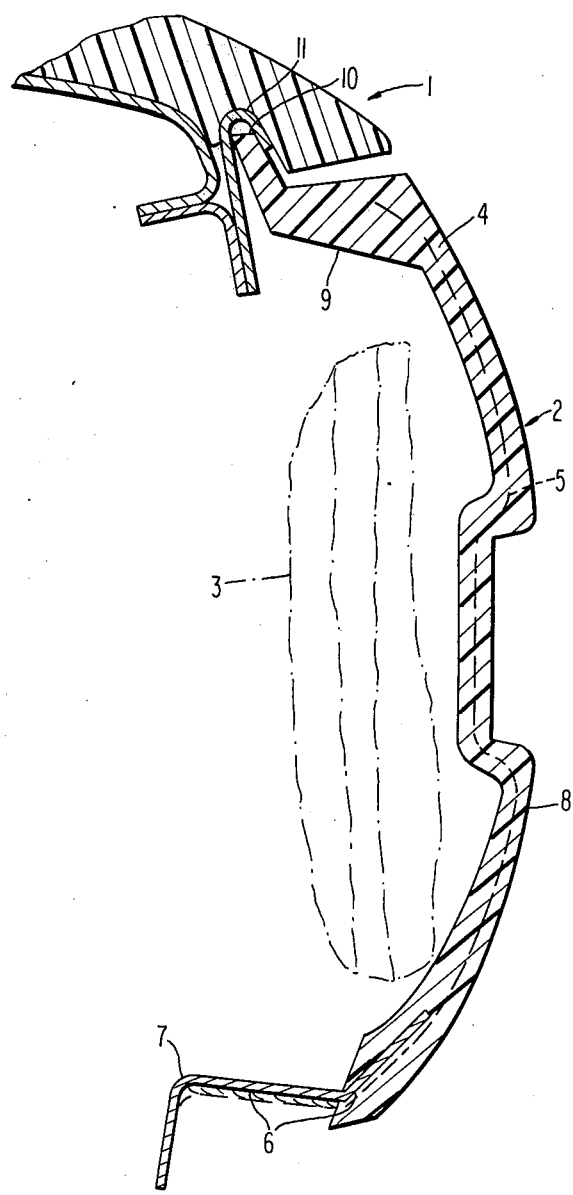

DOWNWARDLY FOLDABLE COVERING FOR A GAS CUSHION

The present invention relates to a covering for a folded gas cushion adapted to open by pivoting down, where the covering is provided with a mesh reinforcement embedded in the padding layer and extending up to the fastening area, as well as with a film delimiting the padding layer on the visible side.

By reason of the forces which occur during the unfolding of the gas cushion and which are limited to a short period of time, the covering must satisfy special requirements. On the one hand, it must be as lightweight as possible in order that the occurring mass forces do not become so large that passengers contacted by the opening covering may be injured. On the other hand, the covering must be so constructed that it withstands the loads and stresses during the opening without tearing and without the likelihood of fragments detaching therefrom.

A covering has already been proposed in the German Offenlegungsschrift No. 26 43 451 which, in addition to an externally disposed film, includes also a reinforcement in the form of a wire mesh that is embedded in the padding layer and extends up to the fastening area. This reinforcement insert leads to a strong weight increase and therewith to an increase of the mass forces during a sudden pivotal unfolding of the covering so that the danger exists that the covering will fail in its area then acting as hinge and tears off. Furthermore, with this prior art covering, an expensive device initiating the opening operation is provided in each case.

It is the aim of the present invention to provide a covering for a folded gas cushion which opens safely in case of danger with the use of simplest means without endangering the passengers by the covering or by parts thereof.

Accordingly, a covering of the aforementioned type adapted to fold open in the downward direction is proposed, whereby according to the present invention the mesh reinforcement consists of a very strong, highly resistant synthetic resinous fabric and prior to the foaming operation is connected, for example, by gluing or bonding with a deformable lower fastening part, and where additionally an anchoring is created by a groove- and spring-like cooperation of at least a section of a boundary edge of the covering with an adjoining fixed body part.

During the unfolding of the gas cushion, the covering vaults or curves outwardly for such length of time until the cooperating groove- and spring-like sections become disengaged. The deformable lower fastening part which may consist of metal or of synthetic plastic material acts as a non-tearable hinge during the further opening of the covering.

It is of advantage if a film is provided along the inside of the covering which provides a particularly low resistance to the unfolding gas cushion.

Accordingly, it is an object of the present invention to provide a covering for a folded gas cushion, especially in motor vehicles, which avoids by simple means the aforementioned shortcomings and drawbacks encountered in the prior art.

Another object of the present invention resides in a covering for a folded gas cushion adapted to open by downward pivotal movement which completely satisfies all of the requirements made of such covering.

A further object of the present invention resides in a covering for a folded gas cushion which is of relatively light weight, yet is capable of withstanding the loads and stresses occurring during the opening without tearing or fragmentation.

Still another object of the present invention resides in a downwardly foldable covering for an inflatable gas cushion of a motor vehicle, which permits a reliable unfolding of the gas cushion in case of danger by extremely simple means without danger to vehicle passengers.

These and other objects, features and advantages of the present invention will become more apparent from the following description when taken in connection with the accompanying drawing which shows, for purposes of illustration only, one embodiment in accordance with the present invention, and wherein:

The single FIGURE of the drawing is a cross-sectional view through a covering for a folded gas cushion in accordance with the present invention.

Referring now to the single FIGURE of the drawing, reference numeral 1 generally designates therein an instrument panel, while reference numeral 2 generally designates therein a covering for a folded gas cushion 3, not shown in detail, which covering is inset into the instrument panel 1. The covering 2 consists of a padding layer 4 which receives embedded therein a mesh reinforcement 5 consisting of very strong synthetic plastic material surrounded by the foamed material of the padding layer 4. The mesh-like reinforcement 5 is secured over a large surface by the adhesive connection 6 to a lower deformable fastening part 7. The latter is connected directly or indirectly with a fixed vehicle part in a manner not illustrated herein.

The padding layer 4 which is covered by an outer decorative film 8 and by an inner film 9 facing the gas cushion 3, which has a particularly low friction value, terminates flange-like at its upper boundary edge 10 so that in cooperation with an adjoining fixed body part 11, a groove- and spring-like connection results.

If the gas cushion 3 inflates in case of danger, then the covering 2 at first curves outwardly for such length of time until the upper boundary edge 10 becomes free. The covering then pivots downwardly whereby the lower deformable fastening part 7 serves as hinge.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. Downwardly flippable cover for a gas bag arranged in the folded condition, wherein the cover is provided with a fabric reinforcement arranged in a hidden fashion and being in contact with a lower mounting member, first and second films delimiting a padding layer on the front wall adjacent said gas bag and on the rear wall of the cover respectively, and wherein anchoring is afforded by a groove-and-tongue like cooperation of at least one section of a boundary edge with an adjoining part affixed to the car body, characterized in that the fabric reinforcement is fashioned as mesh reinforcement means consisting of a high-strength synthetic resin fabric, which is bonded prior to the foam-encompassing step, with the lower mounting member by cementing, the lower mounting member being deformable during the step of flipping the cover into the open position.

2. A covering according to claim 1, characterized in that said first film provides a particularly low resistance to the unfolding gas bag.

3. A covering according to claim 1 or 2, characterized in that the lower mounting member is fixed with a relatively fixed vehicle part.

* * * * *